United States Patent [19]

Nitoh et al.

[11] Patent Number: 5,234,770
[45] Date of Patent: Aug. 10, 1993

[54] POLYARYLENE SULFIDE RESIN COMPOSITION AND MOLDED ARTICLE THEREOF COMBINED WITH METAL

[75] Inventors: Toshikatsu Nitoh; Kiyokazu Nakamori, both of Shizuoka; Yoshihito Tsukamoto, Chiba, all of Japan

[73] Assignee: Polyplastics Co., Ltd., Osaka, Japan

[21] Appl. No.: 722,385

[22] Filed: Jun. 26, 1991

Related U.S. Application Data

[63] Continuation of Ser. No. 522,497, Apr. 20, 1990, abandoned, which is a continuation of Ser. No. 407,654, Sep. 15, 1989, abandoned.

[30] Foreign Application Priority Data

Oct. 14, 1988 [JP] Japan .................. 63-259180

[51] Int. Cl.$^5$ .................. B32B 27/06; C08K 3/00
[52] U.S. Cl. .................. 428/419; 428/929; 524/424; 524/434; 524/609
[58] Field of Search .................. 524/424, 434; 428/419

[56] References Cited

U.S. PATENT DOCUMENTS

| | | | |
|---|---|---|---|
| 4,017,450 | 4/1977 | Bailey | 260/37 R |
| 4,148,966 | 4/1979 | Davies | 428/411 |
| 4,183,822 | 1/1980 | Collington et al. | 521/143 |
| 4,281,072 | 7/1981 | Wetton et al. | 525/4 |
| 4,284,550 | 9/1981 | Mizuno et al. | 524/605 |
| 4,373,091 | 2/1983 | Edmonds, Jr. et al. | 528/483 |
| 4,395,512 | 7/1983 | Kubota et al. | 524/413 |
| 4,529,769 | 7/1985 | Johnson et al. | 524/425 |
| 4,659,761 | 4/1987 | Leland et al. | 524/262 |
| 4,680,326 | 7/1987 | Leland et al. | 524/424 |
| 4,687,802 | 8/1987 | Hepp | 524/411 |
| 4,703,076 | 10/1987 | Mori | 524/424 |
| 4,740,425 | 4/1988 | Leland et al. | 428/447 |
| 4,746,698 | 5/1988 | Kouyama et al. | |
| 4,749,598 | 6/1988 | Miles | 524/424 |
| 4,774,276 | 9/1988 | Bobsen et al. | 524/434 |
| 4,798,863 | 1/1989 | Leland et al. | 524/413 |
| 4,820,759 | 4/1989 | Ichikawa et al. | 524/413 |

*Primary Examiner*—Melvyn I. Marquis
*Assistant Examiner*—Mark Sweet
*Attorney, Agent, or Firm*—Depaoli & O'Brien

[57] ABSTRACT

A polyarylene sulfide resin composition comprises (A) 100 parts by weight of a polyarylene sulfide resin and (B) 0.05 to 100 parts by weight of at least one gas-trapping agent selected from zinc carbonate, zinc hydroxide and a complex salt of zinc carbonate and zinc hydroxide. It further comprises up to 400 parts by weight of an inorganic filler other than the gas-trapping agent (B) in way of material, the filler being in the form of fibers, particles and/or plates.

16 Claims, No Drawings

POLYARYLENE SULFIDE RESIN COMPOSITION AND MOLDED ARTICLE THEREOF COMBINED WITH METAL

This application is a continuation of application Ser. No. 522,497, filed Apr. 20, 1990, which is a continuation of Ser. No. 407,654, filed Sep. 15, 1989, both now abandoned.

BACKGROUND OF THE INVENTION

The present invention relates to an improved polyarylene sulfide resin composition. More particularly, the present invention is concerned with a polyarylene sulfide resin composition and a molded article thereof having improved properties relative to preventing corrosion and staining of a metal combined with the molded article such as an electric contact.

In recent years, thermoplastic resins having a combination of high heat resistance and chemical resistance with flame retardancy have been desired for electrical and electronic equipment component materials, automobile equipment component materials, and chemical equipment component materials.

Polyarylene sulfide resins including polyphenylene sulfide are among the resins capable of meeting this desire. The demand for polyarylene sulfide resins has expanded also because polyarylenesulfides have excellent properties for the cost.

However, polyarylene sulfide resin has a drawback in that the raw material for production of the resin contains both sulfur and chlorine atoms and as a result by-products containing a large amount of chlorine are formed during synthesis of the resin. Unfortunately, this causes a problem when polyarylene sulfide resin is used as a material for molded components, since metals such as metallic contacts and plated or deposited metallic surfaces in the molded components are corroded and stained. As a result, polyarylene sulfide resin is poor in reliability because metal-polyarylene sulfide composite articles fail to sufficiently exhibit their intended function.

Because of the above-described problem, at the present time, polyarylene sulfide resin cannot be effectively for components which are continuously exposed to high temperature and which have a metallic contact, and thus, such problem limits range of applications of the resin.

The following expedients are known for solving the above problem.

(1) In the manufacturing process of the resin, the amount of inclusion of impurities such as sodium chloride in the resin is reduced by intensively purifying the resin.

(2) A trapping agent is positively added to suppress the formation of corrosive impurities. Examples of trapping agents include calcium carbonate, lithium carbonate (cf. Japanese Patent Laid-Open Nos. 162752/1979 and 229949/1985), hydrotalcite (cf. Japanese Patent Laid-Open No. 275353/1986), and zinc oxide (cf. Japanese Patent Laid-Open No. 181408/1984, Japanese Patent Publication No. 45711/1988 and U.S. Pat. Nos. 4,659,761 and 4,740,425).

(3) The resin is treated at a temperature as high as 200° C. or above to reduce corrosive gases before use.

However, the above methods have respective problems and do not provide any satisfactory solution to the problem. Specifically, it has been found that method (1) wherein the resin is intensively washed can remarkably reduce the content of sodium chloride but, such method scarcely results in any improvement in preventing corrosion of metallic components contained in the molded articles, e.g., silver, aluminum, or iron.

In method (2), it has been found that lithium carbonate reduces generation of chlorinated gas and exhibits the effect of preventing corrosion of some metals such as iron but, exerts no effect on silver and its alloys usually employed in the metallic contact. Further, neither calcium carbonate, hydrotalcite, zinc oxide, etc. prevent corrosion of silver.

It has also been found that method (3) causes side effects such as discoloration and deterioration of the resin matrix at high temperature and results in only a slight effect of preventing corrosion of metals such as silver, aluminum, iron, etc., so that this method has not been regarded as practical.

In order to improve the prevention of the corrosion and staining of a metal during and after molding without detriment to excellent heat resistance, solvent resistance, flame retardancy, and mechanical properties of a polyarylene sulfide resin composition, particularly a polyphenylene sulfide resin composition, the present inventors have attempted to determine which gases are generated when a polyarylene sulfide resin composition is heated and have searched for an additive for trapping these gases.

SUMMARY OF THE INVENTION

Although the addition of various trapping agents has been reported in the above-described patent publications, no significant effect in improving the prevention of corrosion and staining of a metal has been observed by the present inventors. Accordingly, considering the reactivity of these trapping agents, the present inventors have selected zinc compounds from the viewpoint that a useful trapping agent particle should be active as much as possible, particularly reactive with a sulfur-containing gas and that the reaction product should be hardly colored. In view of extensive and intensive studies of zinc compounds, it has been found that although zinc oxide barely functions as a trapping agent, zinc carbonate, zinc hydroxide, or a double salt or a mixture thereof remarkably suppresses the corrosion and staining of metals, such as silver, aluminum or iron, caused by a polyarylene sulfide resin composition.

In accordance with the present invention, a polyarylene sulfide resin composition is provided which comprises (A) 100 parts by weight of a polyarylene sulfide resin and (B) 0.05 to 100 parts by weight of at least one gas-trapping agent selected from zinc carbonate, zinc hydroxide and a complex salt of zinc carbonate and zinc hydroxide. The composition may further comprise up to 400 parts by weight of an inorganic filler other than the gas-trapping agent (B). The filler may be in the form of fibers, particles and/or plates.

The composition preferably comprises as the filler 10 to 250 parts by weight of glass fibers, carbon fibers or particles or plates, alternatively to 400 parts by weight of glass fibers and another filler in the form of particles or plates.

The composition of the present invention can be molded into articles such as parts for electric or electronic appliances which may comprise an article molded from the composition as defined above and a connection made from a metal.

DESCRIPTION OF THE INVENTION

Accordingly, the present invention relates to a polyarylene sulfide resin composition, characterized by comprising:

(A) 100 parts by weight of a polyarylene sulfide resin; and, incorporated therein, (B) 0.05 to 100 weight, based on 100 parts by weight of component (A), of at least one member selected from zinc carbonate, zinc hydroxide, and a double salt composed of both; and (C) 0 to 400 parts by weight, based on 100 parts by weight of component (A), of an inorganic filler selected from a fibrous filler, a particulate or flaky filler other than component (B) and a mixture of both. The present invention relates also to a molded article comprising a combination of said polyarylene sulfide resin composition and a metal.

The base resin as component (A) of the composition of the present invention is a polyarylene sulfide resin and mainly comprises the following repeating units —(—Ar—S—)—, wherein Ar is an arylene group.

Examples of the arylene group (—Ar—) include:

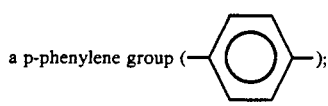
a p-phenylene group

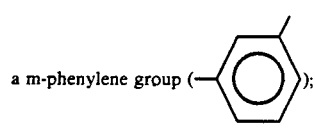
a m-phenylene group

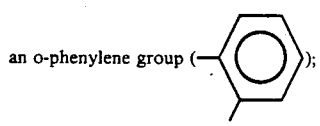
an o-phenylene group

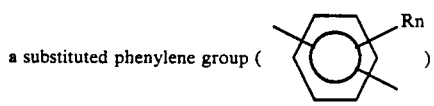
a substituted phenylene group wherein R is an alkyl group, preferably a C$_1$ to C$_6$ alkyl group or a phenyl group and n is an integer of 1 to 4;

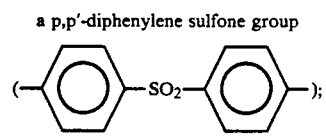
a p,p'-diphenylene sulfone group

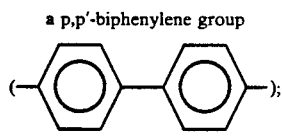
a p,p'-biphenylene group

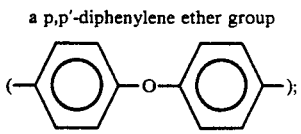
a p,p'-diphenylene ether group

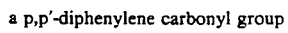
a p,p'-diphenylene carbonyl group

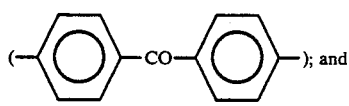
; and

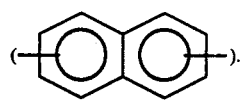
a naphthalene group

It is possible to use a polymer comprising the same repeating units among arylene sulfide groups constituting the above-described arylene groups, i.e., a homopolymer. In some cases, a copolymer containing different kinds of repeating units is preferable from the viewpoint of workability of the composition.

The homopolymer is more preferably a substantially linear polymer comprising p-phenylene sulfide groups as the repeating unit wherein a p-phenylene group is used as the arylene group.

The copolymer may comprise two or more different kinds of arylene sulfide groups composed of the above-described arylene groups. Among them, combinations including a p-phenylene sulfide group and a m-phenylene sulfide group are particularly preferred. In particular, a substantially linear polymer comprising at least 50% by mole, preferably at least 60% by mole, still preferably at least 70% by mole of p-phenylene sulfide groups is suitable from the viewpoint of properties such as heat resistance, moldability, and mechanical properties.

The m-phenylene sulfide groups are contained in an amount of preferably 5 to 50% by mole, particularly preferably 10 to 25% by mole.

A copolymer comprising repeating units of the components in the block form (e.g., one described in Japanese Patent Laid-Open No. 14228/1986) is preferably used because it is substantially the same as the copolymer comprising repeating units of the components in the random form in workability but superior in heat resistance and mechanical properties.

The polyarylene sulfide resin as component (A) used in the present invention may be a polymer improved in moldability by raising the melt viscosity through curing of the above-described polymer by taking advantage of oxidation cross-linking or thermal crosslinking or may be a polymer having a substantially linear structure and prepared by polycondensation of monomers mainly composed of bifunctional monomers. The latter polymer having a substantially linear structure is usually preferable because the molded article thereof exhibits better properties.

Besides the above-described polymers, a blended resin prepared by blending a crosslinked polyarylene sulfide resin capable of exhibiting gelation when melted and prepared through polymerization of a monomer mixture containing a monomer having three or more functional groups as part of the monomer component with the above-described substantially linear polymer may be also used as the base resin of the present invention.

Further, besides the polyarylene sulfide resin, it is also possible to use as an auxiliary a small mount of another thermoplastic resin as far as it exerts no adverse effect on the purpose. The another thermoplastic resin used therein may be any thermoplastic resin stable at a high temperature.

Examples of the another thermoplastic resin include aromatic polyesters of an aromatic dicarboxylic acid with a diol, such as polyethylene terephthalate or polybutylene terephthalate, and those of a hydroxy carboxylic acid, polyamide, polycarbonate, ABS, polyphenylene oxide, polyalkyl acrylate, polyacetal, polysulfone, polyether sulfone, polyether imide, polyether ketone, fluororesin, etc. These thermoplastic resins may be used also in the form of a mixture of two or more of them.

Component (B) used in the present invention is any one of zinc carbonate, zinc hydroxide and a double salt or a mixture thereof.

Zinc carbonate and zinc hydroxide are generally prepared by adding a salt of carbonic acid, such as soda ash, or other hydroxide to an aqueous solution of zinc salt, such as zinc sulfate, zinc chloride, zinc nitrate or zinc acetate, to form a precipitate and washing, filtering, and drying the precipitate. The resultant substance is a mixture of zinc carbonate with zinc hydroxide and called "basic zinc carbonate". This substance is one of the substances preferably used in the present invention.

Besides the above substances, zinc orthocarbonate prepared by adding sodium bicarbonate to an aqueous solution of a zinc salt while blowing a carbon dioxide gas into the system is effective in attaining the purpose of the present invention. However, in the case of zinc oxide, the effect intended in the present invention is so small that zinc oxide is not suitable for use in the present invention.

Further, other zinc compounds, e.g. zinc chloride, zinc bromide, zinc fluoride, zinc iodide, zinc sulfate, zinc nitrate, zinc sulfite, zinc thiocyanate, zinc formate, zinc acetate, zinc propionate, zinc benzoate, zinc oxalate, zinc lactate, zinc tartrate, zinc oleate, zinc stearate, zinc phosphate, zinc phosphite, zinc hypophosphite, zinc hydrogenphosphite, zinc pyrophosphate, zinc chromate, zinc silicate, and zinc silicofluoride are unsuitable for use in the present invention because they are not difficult to safely and stably knead with the resin from the viewpoint of delinquescene, acidity, thermal resistance, toxicity, etc. but also low in the effect intended in the present invention.

Further, metallic zinc powder as well is so low in the effect intended in the present invention that it is unsuitable for use in the present invention.

The amount of component (B) used in the present invention is 0.05 to 100 parts by weight, preferably 0.1 to 40 parts by weight per 100 parts by weight of a polyarylene sulfide resin as component (A). When the amount is less than 0.05 part be weight, the effect intended in the present invention is poor, while when the amount is too large, there arises a problem of reduction in the mechanical strengths of the molded article, which is unfavorable.

Although the inorganic filler as component (C) used in the present invention is not always necessary, it is preferred to incorporate this component for the purpose of preparing a molded article excellent in performance such as mechanical strengths, thermal resistance, dimensional stability (resistance to deformation and warping), and electrical properties. Any of fibrous, particulate and flaky fillers may be used as the inorganic filler depending upon the purposes.

Examples of the fibrous filler include inorganic fibrous substances such as glass fiber, asbestos fiber, carbon fiber, silica fiber, silica-alumina fiber, zirconia fiber, boron nitride fiber, silicon nitride fiber, boron fiber and potassium titanate fiber, and fibrous metals such as stainless steel, aluminum, titanium, copper, and brass. Among them, glass fiber and carbon fiber are representative fibrous fillers. It is also possible to use high-melting organic fibrous materials such as polyamides, fluororesins, and acrylic resins.

Examples of the particulate fillers include carbon black, silicates such as silica, quartz powder, glass bead, glass powder, calcium silicate, aluminum silicate, kaolin, talc, clay, diatomaceous earth and wollastonite, metallic oxides such as iron oxide, titanium oxide and alumina, metal salts of carbonic acid such as calcium carbonate and magnesium carbonate, metal salts of sulfuric acid such as calcium sulfate and barium sulfate, and other fillers such as silicon carbide, silicon nitride, boron nitride, and various powdery metals.

Examples of the flaky filler include mica, glass flake, and various metal foils.

These inorganic fillers may be used alone or in any combination of two or more of them. A combination of a fibrous filler, particularly glass fiber or carbon fiber with a particulate or flaky filler is preferred particularly for the purpose of imparting a combination of mechanical properties with dimensional stability, electrical properties, etc.

It is preferred to use a binder or a surface treatment together with the filler according to need. Examples thereof include functional compounds such as epoxy compounds, isocyanate compounds, silane compounds, and titanate compounds. These compounds may be used by previously conducting surface treatment or binding treatment, or alternatively may be added simultaneously in the preparation of the material.

The amount of the inorganic filler as component (C) is 0 to 400 parts by weight, preferably 10 to 250 parts by weight per 100 parts by weight of the polyarylene sulfide resin. When the amount is less than 10 parts by weight, the mechanical strengths are poor, while when the amount is too large, not only does it become difficult to conduct molding operation but also there occurs a reduction in the mechanical strengths of the molded article.

The composition of the present invention may be mixed with known substances which are added to ordinary thermoplastic and thermosetting resins, i.e., plasticizers, stabilizers such as antioxidants and ultraviolet absorbers, antistatic agents, surface treatments, surfactants, flame retardants, colorants such as dyes and pigments and lubricants for improving the flowability and releasability, lubricating agents, and crystallization accelerators (nucleating agents) depending upon the intended performance in such an amount as will not hinder the purpose of the present invention.

The resin composition of the present invention can be prepared by making use of facilities and methods employed in the preparation of ordinary synthetic resin compositions. They include, for example, a method which comprises mixing necessary components, kneading the mixture with a single-screw or twin-screw extruder, and conducting extrusion to prepare pellets for molding; and a method wherein in order to improve the dispersion and mixing of each component, part or the whole of the resin components are pulverized, and mixing and melt extrusion are then conducted.

The resin composition thus prepared is molded by injection molding, extrusion molding, vacuum molding, compression molding, etc. and suitable for a molded article combined with a metal or a molded article to be brought into contact with a metal, such as an outsert or an insert, by virtue of less tendency to corrode and stain the metal, particularly useful not only for electrical and electronic components etc. having a metallic contact but also from the general point of view because of less tendency to bring about corrosion and staining of a cylinder mold during fabrication.

As is apparent from the foregoing description, the polyarylene sulfide resin composition containing a zinc compound incorporated thereinto according to the present invention exhibits the following effects.

(1) Since corrosion and staining of a metal can be greatly reduced when it is used at a high temperature, application to electrical and electronic components having a metallic contact brings about a significant reduction in the trouble of contamination of the contact. Further, the cost of a component can be reduced because it becomes possible to use a polyarylene sulfide resin in preparing a component which could not be prepared without an expensive material hitherto.

(2) Excellent thermal resistance, solvent resistance, and flame retardancy characteristic of a polyarylene sulfide resin are maintained. Further, a lowering in the mechanical properties is small.

(3) Occurrence of an odor characteristic of a polyarylene sulfide resin composition during kneading and molding is reduced, which contributes to an improvement in the working environment. Further, it is possible to conduct economical and efficient working because corrosion and staining of a cylinder, a mold, etc. hardly occur during molding.

(4) Since the additive is inexpensive and has excellent extruding and kneading properties, the resin composition can be produced at a low cost.

(5) The additive is non-toxic and safe as opposed to other heavy metals.

EXAMPLES

Examples 1 to 14 and Comparative Examples 1 to 7

As shown in Table 1, a zinc compound shown in Table 1 was added as component (B) to a substantially linear polyphenylene sulfide resin (trade mark of "Fortron"; a product of Kureha Chemical Industry Co., Ltd.) as component (A) and then mixed therewith by a Henschel mixer for 2 min.

Then, an inorganic filler as component (C) was added thereto in an amount shown in Table 1 and mixed by means of a blender for 30 sec. The mixture was kneaded by means of an extruder at a cylinder temperature of 310° C to prepare pellets of a polyphenylene sulfide resin composition.

22 g of the pellets were put on the bottom of a test tube having an outer diameter of 30 mm and a height of 150 mm, and a metallic sheet shown in Table 1 was cut into a size of 2 mm×12 mm and suspended with a thread in such a manner that the metallic sheet was positioned at a height of about 60 mm from the uppermost pellets. A stopper was put on the top of the test tube, and the test tube was then placed in a blast dryer to conduct treatment under evaluation test conditions shown in Table 1. The metallic sheet was taken out of the test tube and subjected to visual evaluation of appearance and measurement of electrical resistance of the surface under a contact pressure of 10 g with a milliohmmeter to evaluate corrosive and staining properties of the resin composition. The results are shown in Table 1.

The above-described pellets were molded into an ASTM specimen with an injection molding machine at a cylinder temperature of 320° C. and a mold temperature of 150° C., and the specimen was subjected to measurement of the tensile strength and tensile elongation.

TABLE 1

| | Composition | | | | |
|---|---|---|---|---|---|
| | component (A) polyphenylene sulfide resin | component (B) additive | | component (C) filler | |
| | [pt. wt.] | [kind] | [pt. wt.] | [kind] | [pt. wt.] |
| Ex. 1 | 100 | transparent[a] zinc white | 0.05 | glass[b] fiber | 70 |
| Ex. 2 | 100 | transparent[a] zinc white | 0.1 | glass[b] fiber | 70 |
| Ex. 3 | 100 | transparent[a] zinc white | 1 | glass[b] fiber | 70 |
| Ex. 4 | 100 | transparent[a] zinc white | 10 | glass[b] fiber | 70 |
| Ex. 5 | 100 | transparent[a] zinc white | 70 | glass[b] fiber | 70 |
| Ex. 6 | 100 | transparent[a] zinc white | 1 | — | — |
| Ex. 7 | 100 | transparent[a] zinc white | 1 | glass[b] fiber calcium carbonate | 100 100 |
| Ex. 8 | 100 | transparent[a] zinc white | 1 | glass[b] fiber | 70 |
| Ex. 9 | 100 | transparent[a] zinc white | 1 | glass[b] fiber | 70 |
| Ex. 10 | 100 | transparent[a] zinc white | 1 | glass[b] fiber | 70 |
| Ex. 11 | 100 | zinc ortho-carbonate | 1 | glass[b] fiber | 70 |
| Ex. 12 | 100 | zinc ortho-carbonate | 1 | glass[b] fiber | 70 |
| Ex. 13 | 100 | zinc hydroxide | 1 | glass[b] fiber | 70 |
| Ex. 14 | 100 | zinc hydroxide | 70 | glass[b] fiber | 70 |

TABLE 1-continued

| | | | | | |
|---|---|---|---|---|---|
| Comp. Ex. 1 | 100 | — | — | glass[b] fiber | 70 |
| Comp. Ex. 2 | 100 | zinc oxide[d] | 1 | glass[b] fiber | 70 |
| Comp. Ex. 3 | 100 | zinc oxide[e] | 1 | glass[b] fiber | 70 |
| Comp. Ex. 4 | 100 | — | — | glass[b] fiber calcium carbonate | 100 100 |
| Comp. Ex. 5 | 100 | lithium carbonate | 1 | glass[b] fiber | 70 |
| Comp. Ex. 6 | 100 | zinc sulfate | 1 | glass[b] fiber | 70 |
| Comp. Ex. 7 | 100 | zinc chloride | 1 | glass[b] fiber | 70 |

| | Evaluation of corrosion of metal | | | | Evaluation of general properties | |
|---|---|---|---|---|---|---|
| | metal | evaluation test conditions | electrical resistance [mΩ] | evaluation of appearance | tensile strength [kgf/cm$^2$] | tensile elongation [%] |
| Ex. 1 | silver | 265° C. × 1 hr | 31 | small discoloration | 1750 | 1.6 |
| Ex. 2 | silver | 265° C. × 1 hr | 22 | slight discoloration | 1740 | 1.6 |
| Ex. 3 | silver | 265° C. × 1 hr | 12 | no discoloration | 1650 | 1.5 |
| Ex. 4 | silver | 265° C. × 1 hr | 9 | no discoloration | 1400 | 1.1 |
| Ex. 5 | silver | 265° C. × 1 hr | 10 | no discoloration | 1320 | 1.0 |
| Ex. 6 | silver | 265° C. × 1 hr | 13 | no discoloration | 870 | 4.0 |
| Ex. 7 | silver | 265° C. × 1 hr | 9 | no discoloration | 1420 | 1.0 |
| Ex. 8 | silver | 150° C. × 1 hr | 14 | no discoloration | 1650 | 1.5 |
| Ex. 9 | silver | 265° C. × 1 hr | 21 | slight discoloration | 1650 | 1.5 |
| Ex. 10 | alloy[c] | 265° C. × 1 hr | 12 | no discoloration | 1650 | 1.5 |
| Ex. 11 | silver | 265° C. × 1 hr | 9 | no discoloration | 1570 | 1.4 |
| Ex. 12 | silver | 265° C. × 1 hr | 10 | no discoloration | 1090 | 0.9 |
| Ex. 13 | silver | 265° C. × 1 hr | 10 | no discoloration | 1490 | 1.3 |
| Ex. 14 | silver | 265° C. × 1 hr | 9 | no discoloration | 1020 | 0.9 |
| Comp. Ex. 1 | silver | 265° C. × 1 hr | 430 | remarkable discoloration | 1750 | 1.6 |
| Comp. Ex. 2 | silver | 265° C. × 1 hr | 175 | remarkable discoloration | 1720 | 1.6 |
| Comp. Ex. 3 | silver | 265° C. × 1 hr | 150 | remarkable discoloration | 1740 | 1.6 |
| Comp. Ex. 4 | silver | 265° C. × 1 hr | 390 | remarkable discoloration | 1450 | 1.0 |
| Comp. Ex. 5 | silver | 265° C. × 1 hr | 295 | remarkable discoloration | 1610 | 1.5 |
| Comp. Ex. 6 | silver | 265° C. × 1 hr | 530 | remarkable discoloration | 1280 | 1.0 |
| Comp. Ex. 7 | silver | 265° C. × 1 hr | 815 | remarkable discoloration | 1350 | 1.1 |

Note)
[a]$2ZnCO_3 \cdot 3Zn(OH)_2$
[b]chopped strand having a diameter of 13 μm and a length of 3 mm
[c]silver-palladium-copper alloy
[d]zinc white having a ZnO content of 98.5% and a mean particle diameter of 0.65 μm (according to American process)
[e]zinc white having a ZnO content of 99.7% and a mean particle diameter of 0.27 μm (according to French process)

Example 15 and Comparative Example 8

Pellets prepared in Example 3 and Comparative Example 1 were injection molded into components having a brass-nickel-plated lead frame inserted thereinto by an injection molding machine through the use of a mold for a rotary switch housing at a cylinder temperature of 320° C. and a mold temperature of 150° C.

Separately, the same pellets were injection molded into rotor components by making use of a mold for a rotor component, and a brass-nickel-plated contact was then jointed thereto by caulking. Further, an O-ring made of silicone rubber was mounted on the rotors. The same pellets were molded into switch lid components by making use of a mold for a switch lid, and the rotors were respectively integrated into the switch lids. Then, the switch lids were inserted into the housings, and the lids were subjected to ultrasonic welding to assemble rotary switches. The rotary switches thus prepared were treated in a blast dryer under test conditions shown in Table 2 and then subjected to functional tests. The results are shown in Table 2.

Example 16 and Comparative Example 9

Pellets prepared in Example 3 and Comparative Example 1 were injection molded into rotor components by an injection molding machine through the use of a mold for a rotary component at a cylinder temperature of 320° C. and a mold temperature of 150° C. A silver-palladium-copper alloy contact was jointed thereto by caulking to prepare rotor components.

These rotor components were assembled through an O-ring to a separately prepared epoxy resin housing having a resistor mounted thereon to prepare a rotary switch (semifixed volume). The molded components thus prepared were treated in a blast dryer under test conditions shown in Table 3 and then subjected to functional tests. The results are shown in Table 3.

TABLE 2

| | | Composition | | | | | | Evaluation | |
|---|---|---|---|---|---|---|---|---|---|
| | Molded article | component (A) polyphenylene sulfide resin [pt. wt.] | component (B) additive [kind] | [pt. wt.] | component (C) filler [kind] | [pt. wt.] | Combination metal | test conditions | results |
| Ex. 15 | rotary switch | 100 | trans-parent[a] zinc white | 1 | glass[b] fiber | 70 | insert molding of brass-nickel-plated lead frame | 150 × 168 hr | excellent current value in changeover test of switch |
| Comp. Ex. 8 | rotary switch | 100 | — | — | glass[b] fiber | 70 | insert molding of brass-nickel-plated lead frame | 150 × 168 hr | abnormal current value in changeover test of switch |

Note)
[a] $2ZnCO_3 \cdot 3Zn(OH)_2$
[b] chopped strand having a diameter of 13 μm and a length of 3 mm

TABLE 3

| | | Composition | | | | | | Evaluation | |
|---|---|---|---|---|---|---|---|---|---|
| | Molded article | component (A) polyphenylene sulfide resin [pt. wt.] | component (B) additive [kind] | [pt. wt.] | component (C) filler [kind] | [pt. wt.] | Combination metal | test conditions | results |
| Ex. 16 | semifixed volume | 100 | trans-parent[a] zinc white | 1 | glass[b] fiber | 70 | integration of silver-palladium-copper alloy frame | 265 × 1 hr | excellent resistance value in changeover test |
| Comp. Ex. 9 | semifixed volume | 100 | — | — | glass[b] fiber | 70 | integration of silver-palladium-copper alloy frame | 265 × 1 hr | abnormal resistance value in changeover test |

Note)
[a] $2ZnCO_3 \cdot 3Zn(OH)_2$
[b] chopped strand having a diameter of 13 μm and a length of 3 mm

Examples 17 and Comparative Example 10

As shown in Table 4, a zinc compound shown in Table 4 was added as component (B) to a polyphenylene sulfide resin (trade mark of "Fortron KPS"; a product of Kureha Chemical Industry Co., Ltd.) as component (A) and then mixed therewith by a Henschel mixer for 2 min.

Then, an inorganic filler (calcium carbonate) as component (C) was added thereto in an amount shown in Table 4 and mixed by means of a blender for 30 sec. The mixture was kneaded by means of an extruder at a cylinder temperature of 310° C. to prepare pellets of a polyphenylene sulfide resin composition. The obtained pellets were molded into an injection molded article with an injection molding machine through the use of a mold for a light reflector plate at a cylinder temperature of 320° C. and a mold temperature of 150° C. This molded article was subjected to ultrasonic cleaning with acetone, and aluminum was vacuum deposited in a thickness of 20 μm on the reflecting surface to prepare a light reflector plate. The reflector plate thus prepared was placed in a blast dryer to conduct treatment under evaluation test conditions shown in Table 4 and then subjected to appearance evaluation. The results are shown in Table 4.

TABLE 4

| | Molded article | Composition component (A) polyphenylene sulfide resin [pt. wt.] | component (B) additive [kind] | [pt. wt.] | component (C) filler [kind] | [pt. wt.] | Combination metal | Evaluation test conditions | results |
|---|---|---|---|---|---|---|---|---|---|
| Ex. 17 | light reflector plate | 100 | transparent[a] zinc white | 1 | calcium carbonate | 150 | vacuum deposition of aluminum in a thickness of 20 μm | 200° C. × 3 hr | excellent surface |
| Comp. Ex. 10 | light reflector plate | 100 | — | — | calcium carbonate | 150 | vacuum deposition of aluminum in a thickness of 20 μm | 200° C. × 3 hr | occurrence of mixture corrosion and staining spots on the surface |

Note)
[a] $2ZnCO_3 \cdot 3Zn(OH)_2$

We claim:

1. An article comprising a molded polyarylene sulfide resin composition and a separate metallic component or metallic surface contacting said molded resin, said metallic component or surface comprising silver or an alloy thereof, said polyarylene sulfide resin composition comprising (A) 100 parts by weight of a polyarylene sulfide resin and (B) 0.05 to 100 parts by weight per 100 parts weight of said polyarylene sulfide resin of at least one gas-trapping agent selected from zinc hydroxide, zinc carbonate or a complex salt of zinc carbonate and zinc hydroxide.

2. The article as claimed in claim 1 wherein said polyarylene sulfide resin composition further comprises (C) 10 to 250 parts by weight per 100 parts weight of said polyarylene sulfide resin of glass fibers or carbon fibers.

3. The article as claimed in claim 1 wherein said polyarylene sulfide resin (A) is polyphenylene sulfide.

4. The article of claim 1 wherein said metallic component is a plated or deposited metallic surface on said molded polyarylene sulfide resin composition.

5. The article as claimed in claim 1 wherein said gas-trapping agent (B) is zinc carbonate.

6. The article as claimed in claim 1 wherein said gas-trapping agent (B) is zinc hydroxide.

7. The article as claimed in claim 1 wherein said gas-trapping agent (B) is a complex salt of zinc carbonate and zinc hydroxide.

8. The article as claimed in claim 1 wherein said polyarylene sulfide resin composition further comprises (C) up to 400 parts by weight of an inorganic filler other than the gas-trapping agent (B), said filler being in the form of fibers, particles, plates or mixtures thereof.

9. The article as claimed in claim 8 wherein said filler (C) comprises 10 to 250 parts by weight per 100 parts weight of said polyarylene sulfide resin of particles or plates.

10. The article as claimed in claim 3 wherein said polyphenylene sulfide is a linear homopolymer of p-phenylene sulfide groups.

11. The article as claimed in claim 3 wherein said polyphenylene sulfide is a copolymer of p-phenylene sulfide groups and m-phenylene sulfide groups.

12. The article as claimed in claim 11 wherein said copolymer comprises at least 50% by mole of said p-phenylene sulfide groups.

13. The article as claimed in claim 11 wherein said copolymer comprises at least 70% by mole of said p-phenylene sulfide groups.

14. The article as claimed in claim 11 wherein said gas-trapping agent (B) is present in amounts of 0.1 to 40 parts by weight per 100 parts weight of said polyarylene sulfide resin.

15. The article of claim 11 wherein said article is an electronic component.

16. The article of claim 11 wherein said metallic component is an electrical contact.

* * * * *